United States Patent [19]

Mayer

[11] 4,338,664

[45] Jul. 6, 1982

[54] METHOD OF EVALUATING FORMATIONS TRAVERSED BY A BOREHOLE

[75] Inventor: Claude Mayer, Paris, France

[73] Assignee: Schlumberger Technology Corporation, New York, N.Y.

[21] Appl. No.: 151,504

[22] Filed: May 19, 1980

[51] Int. Cl.$^3$ .................... G01V 3/18; G01V 3/38; G01V 5/04; G06F 15/20

[52] U.S. Cl. ...................... 364/422; 73/152; 324/351; 364/300; 346/33 WL

[58] Field of Search ............... 364/422, 300; 324/324, 324/338, 351; 73/152; 346/33 WL

[56] References Cited

U.S. PATENT DOCUMENTS

| | | | |
|---|---|---|---|
| 3,817,328 | 6/1974 | Neuman | 73/152 X |
| 3,986,163 | 10/1976 | Elliot | 346/33 WL |
| 4,032,779 | 6/1977 | Arnold et al. | 364/422 X |
| 4,055,763 | 10/1977 | Antkiw | 364/422 X |
| 4,101,476 | 3/1977 | Elliot | 346/33 WL |
| 4,245,313 | 1/1981 | Coates | 364/422 |

OTHER PUBLICATIONS

Thames: Computing in Calculus, Research and Development, May, 1975, vol. 26, No. 5, pp. 24-28, 30.

*Primary Examiner*—Felix D. Gruber

*Attorney, Agent, or Firm*—Bruce N. Carpenter; Stephen L. Borst

[57] ABSTRACT

A method which determines output parameters (such as porosity $\phi$ or water saturation $S_w$ of formations) from a set of logging measurements taken at each level of a borehole is proposed.

Measurement and response equation uncertainties of each logging apparatus are determined at each measurement level. Assumed values of the output parameters are chosen and, applying the response equations, calculated values of the measurements are determined. The calculated values of the measurements and the actual measurements are then compared to determine deviations which are weighted by factors calculated from the previously determined uncertainties. An incoherence function is determined from the weighted deviations and a number of "a-priori" constraints. Minimization of the incoherence function gives the most probable output parameters whose uncertainty is in turn calculated. The computed values of the measurements are plotted alongside an indication of the range of uncertainty of the actual measurements for their comparison so as to provide an indication of the reliability of the derived output parameters, which are also plotted with or without their own range of uncertainties.

26 Claims, 5 Drawing Figures

METHOD OF EVALUATING FORMATIONS TRAVERSED BY A BOREHOLE

TECHNICAL FIELD OF THE INVENTION

This invention relates to logging measurements made in a borehole and more particularly to a method of interpreting these measurements for the evaluation, level by level, of the formations traversed by the borehole.

BACKGROUND OF THE INVENTION

To determine the presence of hydrocarbons in different formations traversed by a borehole, it is conventional to make several different logging measurements at different depths along the borehole. The measurements are then processed to determine values of output parameters indicative of specific borehole characteristics which are more meaningful than the actual measurements but which are not directly measurable themselves. Typical examples of output parameters are porosity $\phi$, water saturation $S_w$ and clay content $V_{cl}$. Examples of some initial, well known, logging measurements include: density $\rho_b$, "neutron" porosity $\phi_N$, acoustical transit time $\Delta t$, natural radioactivity GR, spontaneous potential SP, and various resistivity measurements which laterally penetrate into the formation to different degrees. Each of these measurements are made at a multiplicity of successive levels of the borehole.

Known interpretation methods include a certain number of preliminary processing steps designed essentially to provide corrections and to determine a plurality of borehole zones in which indications of specific borehole characteristics have substantially constant values. Indentification of borehole zones is then followed by the interpretation of each zone, level by level.

A level-by-level interpretation method is described in co-pending application Ser. No. 112,005 filed Feb. 1, 1971, now abandoned, and continued as Ser. No. 060,835, filed July 25, 1979. A corresponding patent has issued as French Pat. No. 2.102.380 (Poupon-Gaymard). Briefly stated, that method consists of evaluating the clay content at each level, correcting the measurements for the clay effect and, assuming values for porosity $\phi$ and for the residual hydrocarbon saturation $S_{hr}$, determining a first hydrocarbon correction which makes it possible to find a first value of $\phi$. This first value of $\phi$ is used for calculating new hydrocarbon corrections which give an improved value of the porosity $\phi$. The water saturation $S_w$ is then calculated from the porosity values $\phi$ and resistivity values $R_t$ of the formations. Several iterations can be applied to obtain good values of $\phi$ and $\rho_{ma}$, the matrix density.

In prior-art methods, certain measurements are chosen and combined to find a first indication of a borehole characteristic, hereafter more conveniently referred to as an output parameter. This output parameter is then combined with new measurements to obtain a subsequent, different output parameter. As is evident, these two output parameters are obtained successively. Use is sometimes made of iterative methods to reintroduce into the calculations an output parameter with better accuracy.

These methods have yielded good results but nevertheless have their drawbacks. A first drawback is that it is difficult to modify the above described technique to take advantage of new or different measurements. For example, if geological or other data derived from cores are known, they cannot be introduced into the interpretative process unless provision has been made at the outset for a certain number of options allowing this to be accomplished. A second drawback is that the prior art methods may be unable to consider a number of measurements of varying quality, some of which could be used to advantage.

It is therefore the object of the invention to provide a method for evaluating formations traversed by a borehole, said method taking into consideration most, if not all, of the information available, including "a-priori" information.

It is another object of the invention to provide a method for evaluating formations which takes into account the uncertainity with which each measurement is obtained. Thus, a measurement having a low precision will participate in the interpretation but with little influence. In this way, no information is neglected and the various information is given only the influence it deserves.

It is a further object of the invention to provide a method which produces new output parameters and new presentations for both the output parameters and the initial measurements.

THE INVENTION

According to the invention, a method is provided for determining output parameters or indications of the characteristics of the formations at different levels of a borehole in which the step of producing logging measurements for each investigated level of the borehole includes determining measurement uncertainties. In a subsequent step, the most probable output parameters corresponding to all the measurements are determined, while taking these uncertainties into account.

The uncertanities associated with the measurements are derived from several specific uncertainties, at least some of which depend on environmental conditions at the level of investigation. These specific uncertainties can be due, for example, to the roughness of the borehole, to the statistical variations in the measurements, or to depth correlation errors. In one embodiment of the invention the uncertainty associated with a particular measurement is taken to be the square root of the sume of the squares of the specific uncertainties. It is often preferable to choose a first value of uncertainty for positive deviations and a second value of uncertainty for negative deviations in relation to the measurement. One also determines at each level the uncertainties of the logging apparatus response equations as a function of the estimated initial values of the output parameters.

To calculate the most probable output parameters, an iteration process is used in which an initial value of each of the output parameters is assumed. A plurality of response equations, each of which relates a single measured parameter to the output parameters, are solved simultaneously to determine theoretical values for the measured parameters from the assumed output parameters. Deviations between the calculated values of the measured parameters and the actually measured values of the measured parameters are next obtained. An incoherence function is then derived from said deviations multiplied by weighting factors obtained from the uncertainties of the measurements and the uncertainties inherent in the response equations. And, finally, the incoherence function is minimized by iteration to obtain the best values of each of the output parameters. The weighting factors are determined, for example, by calculating the inverse of the sum of the squares of the uncertainties of the measurements and the squares of the uncertainties of the response equations. The incoherence function may also include terms representing "a-priori" constraints.

After having obtained the most probable value for each of the output parameters, an indication of uncertainty is determined for each output parameter. This process is repeated at each level and the results may be represented by graphs on which are plotted log curves showing the limits of the uncertainty range of each output parameter. Theoretical values of the measured parameters; i.e., those values which correspond to the most probable output parameters, may also be obtained by substituting the most probable output parameters in the response equations. It is then possible to compare on the same graph the theoretical values of the measured parameters and the actual values of the measured parameters by representing the theoretical measurement values by a curve and the actual measurement values by their uncertainty range.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures in which.

DESCRIPTION OF THE BEST MODE OF THE INVENTION

While the invention is susceptible of various modifications and alternative constructions, there is shown in the drawings and there will hereinafter be described, in detail, a description of the preferred or best mode of the invention. It is to be understood, however, that the specific description and drawings are not intended to limit the invention to the specific form disclosed. On the contrary, it is intended that the scope of this patent include all modifications and alternative constructions thereof falling within the spirit and scope of the invention as expressed in the appended claims to the full range of their equivalents.

In the example to be described below, the method of the invention is used for determining, level by level, output parameters such as the porosity of the formations $\phi$ and their water saturation $S_w$ which are generally provided at the end of a complete borehole analysis. The method of the invention may also be used for initially determining at each level intermediate output parameters such as, for example, the resistivity of the virgin zone $R_t$ and the resistivity of the invaded zone $R_{xo}$ by combining several resistivity log measurements.

PRODUCTION OF MEASUREMENTS

Figure 1:
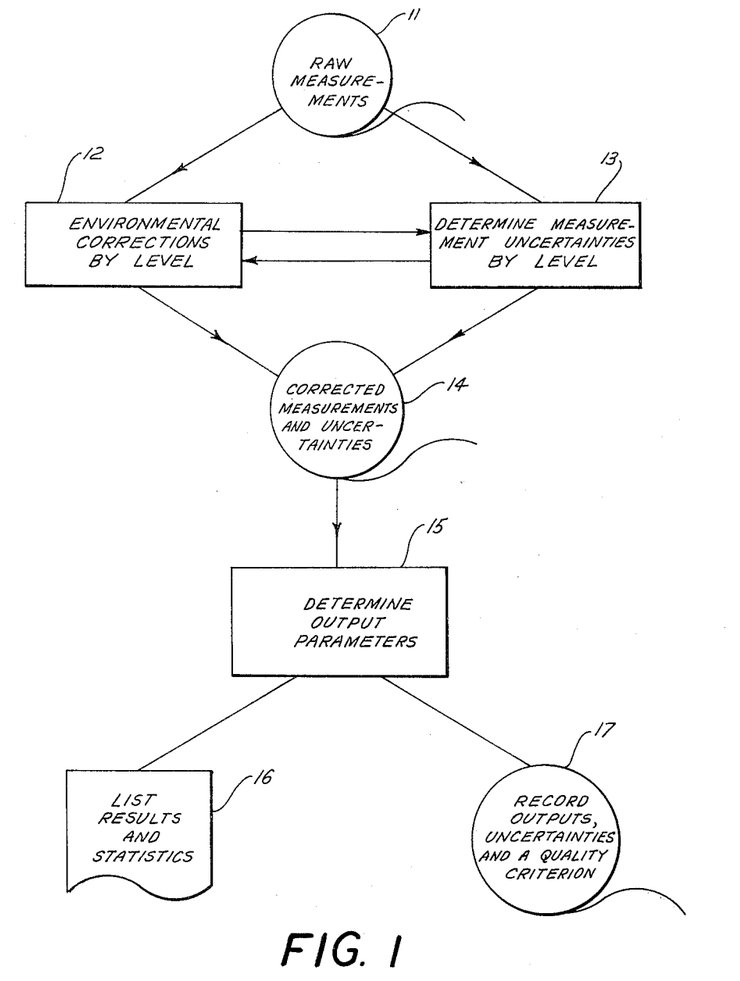
FIG. 1 is a generalized diagram showing the path of the data in an embodiment of the method according to the invention for the evaluation of the formations traversed by a borehole.

The method, generally outlined in FIG. 1, begins with the production of conventional logging measurements at the different levels of a borehole. The logging measurements include measurements of the bulk density $\rho_b$ of the formations traversed by the borehole, measurements of the neutron porosity $\phi_N$ of the formations, measurements of the acoustical transit time $\Delta t$, the natural radioactivity GR and the spontaneous potential SP. Values of the resistivity $R_t$ of the virgin zone and the resistivity $R_{xo}$ of the invaded zone of the logging formations are also obtained, albeit indirectly, from initial actual logging measurements derived from induction logs, focused resistivity logs, and resistivity logs having a small investigation depth.

Logging apparatus which furnish these measurements are well known to specialists. Measurements of density $\rho_b$ can be carried out by means of a gamma-ray emission and detection logging apparatus, described in U.S. Pat. No. 3,321,625 (J. S. Wahl). Measurements of porosity $\phi_N$ can be carried out by means of a neutron emission and detection apparatus described in U.S. Pat. No. 3,483,376 (S. Locke, et al.). Measurements of the acoustical transit time $\Delta t$ can be carried out by means of an apparatus of the type described in U.S. Pat. No. 3,257,639 (F. P. Kokesh). The spontaneous potential SP and the measurements of deep and shallow resistivities can be obtained by means of an apparatus such as the one described in U.S. Pat. No. 3,453,530 (G. Attali).

Generally, the different logging measurements are recorded as a function of depth during several trips in the borehole to furnish magnetic tapes on which are recorded, level by level, several crude measurements (11 of FIG. 1). Measurements corresponding to the same depth are then selected to obtain a collection of values of measurement parameters for a given level. The method of the invention could also be applied to measurements produced by a combined logging apparatus moved in a single operation in the borehole. In this case, the measurements could be processed in real time to furnish output parameters giving as a first approximation estimated values of the output parameters mentioned earlier.

During a conventional preliminary processing step (12), the produced measurement parameters $\rho_b$, $\phi$, $\Delta t$, GR and SP are corrected for environmental conditions and in particular for the influence of the borehole. For example, corrections are made for the influence of mud and of mudcake which may have been deposited on the borehole wall. Such corrections are well known in the art of logging and are not part of the present invention. During this processing, the borehole is divided into zones of the same lithology for which some of the clay parameters and fluid parameters, for example $R_w$ and $\rho_h$, are substantially constant.

CALCULATION OF UNCERTAINTIES OF MEASURMENTS

In the following step (block 13) an estimate of the uncertainty $\sigma_i$ associated with each measurement, level by level, is determined.

The measurements are in fact subject to errors due mainly to the local environmental conditions. To determine the uncertainty of each measurement, many measurements are studied statistically in order to find independent error sources. It is thus possible to determine independent specific uncertainties $\sigma_1, \sigma_2, \ldots \sigma_p$ and then to calculate the uncertainty $\sigma_i$ of the measurement by an equation of the following form:

$$\sigma_i = \sqrt{\sigma_1^2 + \sigma_2^2 + \ldots + \sigma_p^2} \tag{1}$$

The uncertainties can be calculated from the values of the measurement parameters without making assumptions regarding the output parameters. Each specific uncertainty is determined either from the measurement value itself at the studied level or nearby levels, or from other measurement parameter values made at the studied level or nearby levels. We shall see later that other uncertainties are involved in the method of the invention, due to an indeterminancy of the logging apparatus response equations.

As an example, we shall describe in detail the calculation of the uncertainty for the measurement of the natural radioactivity of the formation (GR). The uncertainty $\sigma_{GR}$ for the gamma ray measurement is calculated by the equation:

$$\sigma_{GR} = \sqrt{\sigma_1^2 + \sigma_2^2 + \sigma_3^2 + \sigma_4^2} \tag{2}$$

in which $\sigma_1$ to $\sigma_4$ are specific uncertainties due to distinct error sources. These specific uncertainties are calculated individually as follows in accordance with the environmental conditions at the studied level.

The uncertainty $\sigma_1$ is due to the fact that the corrections of the borehole effects on the response of the radioactivity measuring tool are imprecise. This uncertainty depends on the raw value $GR_{raw}$ of the measurement and on the correction for environmental factors. If C is the applied correction factor and $C_{nom}$ the correction factor needed for the nominal diameter of the borehole, $\sigma_1$ is calculated by the equation:

$$\sigma_1 = (GR_{raw}/2)(C - C_{nom}) \tag{3}$$

The uncertainty $\sigma_2$ is due to the statistical variations affecting the gamma ray count rates used for the radioactivity measurement and depends on the value of the measurement GR itself. It is calculated by the equation:

$$\sigma_2 = \sqrt{\frac{GR}{2}} \tag{4}$$

The uncertainty $\sigma_3$ is due to the errors on the correlation of the measurements in depth and depends on the instability of the measurement at the studied level. It is obtained by the following equation:

$$\sigma_3 = \frac{|GR_n - GR_{(n-1)}| + |GR_n - GR_{(n+1)}|}{2} \tag{5}$$

$GR_{(n-1)}$ and $GR_{(n+1)}$ being the values of GR obtained at the levels located immediately under and over the considered level n.

The uncertainty $\sigma_4$ is due to an error on the zero generally introduced when calibrating the logging apparatus. This uncertainty is calculated by the equation:

$$\sigma_4 = 1 \text{ API unit} \tag{6}$$

The specific uncertainties are calculated as a function of the measurement itself (GR in the above example) at the examined level or at nearby levels. The specific uncertainties may also be calculated as a function of other measurements such as the diameter of the borehole at the examined level or at nearby levels. It should be understood that the numerical coefficients are given only as a guide and can be modified in accordance with experimental results to improve certain particular cases of interpretation.

The specific uncertainty of the measurement $\phi_N$ similarly comprises several specific uncertainties obtained according to the measurements by equations which are slightly different but of the same kind, namely an uncertainty due to the borehole effect corrections, an uncertainty due to the statistical variations, an uncertainty due to the borehole diameter and an uncertainty due to the errors on the correlation of measurements in depth. The general uncertainty on the measurement of the acoustical transit time $\Delta t$ includes an uncertainty on the zero and an uncertainty due to depth correlation.

The uncertainty of the density $\rho_b$ is also calculated by means of several specific uncertainties due respectively to the borehole effect corrections, statistics, borehole rugosity, mudcake correction, and depth correlation of the measurements. For the measurement of the spontaneous potential SP, the uncertainty is obtained by means of an uncertainty due to the zero error and an uncertainty due to depth correlation.

The various equations making it possible to calculate each of the specific uncertainties are obtained by statistically studying many values of each measurement as a function of each cause of error. It is thus possible to determine the equations giving the specific uncertainties. These equations depend on the measurement apparatus used and are obviously different for different types of apparatus.

In addition, values of the resistivity of the virgin zone $R_t$ and of the invaded zone $R_{xo}$ are produced with estimates of their uncertainties at each level. In order to obtain $R_t$ and $R_{xo}$, it is necessary to introduce several resistivity measurements with different investigation depths. While it will be recognized that $R_t$ and $R_{xo}$ are calculated values rather than measured formation parameters, they will be treated as if they were one of the directly measured parameters. As mentioned previously, the technique of the present invention may be utilized to obtain $R_t$ and $R_{xo}$. The general method for obtaining $R_t$ and $R_{xo}$ should become apparent from this description of the best known mode for practicing the invention and will be omitted for the sake of brevity and clarity.

The result of this entire first part is the production, level by level, of measurements of $\rho_b$, $\phi_N$, $\Delta t$, GR, SP, $R_t$ and $R_{xo}$ with their uncertainties (block 14). We saw that these measurements were corrected and that certain ($R_t$, $R_{xo}$) have already undergone complex processing operations after the actual taking of the measurements.

DETERMINATION OF ZONE PARAMETERS

A second part of the processing, which does not form part of the invention, consists in determining, for each geological zone, the values of the zone parameters. These zone parameters are those whose values remain substantially constant within the examined zone. They include first of all clay parameters $\rho_{cl}$, $\phi_{Ncl}$, $\Delta t_{cl}$, $GR_{cl}$, $R_{cl}$ which are the respective values in clay of the bulk density, the neutron porosity, the acoustical transit time, the natural radioactivity and the resistivity. The zone parameters also include formation fluid parameters which are substantially constant. They are: $\Delta t_{fl}$, the transit time of the formation fluids, $\rho_h$, the density of the hydrocarbons and $R_w$, the resistivity of the formation water. The zone parameters also include properties of the mud filtrate such as density $\rho_{mf}$, salinity P and resistivity $R_{mf}$. This determination of zone parameters can be carried out automatically by the method described in the copending application, Ser. No. 310,484, filed Nov. 29, 1972, (inventors: A. Poupon and J. C. Favard). A corresponding patent has issued as French Pat. No. 2.102.123.

OUTPUT PARAMETERS

Figure 2:
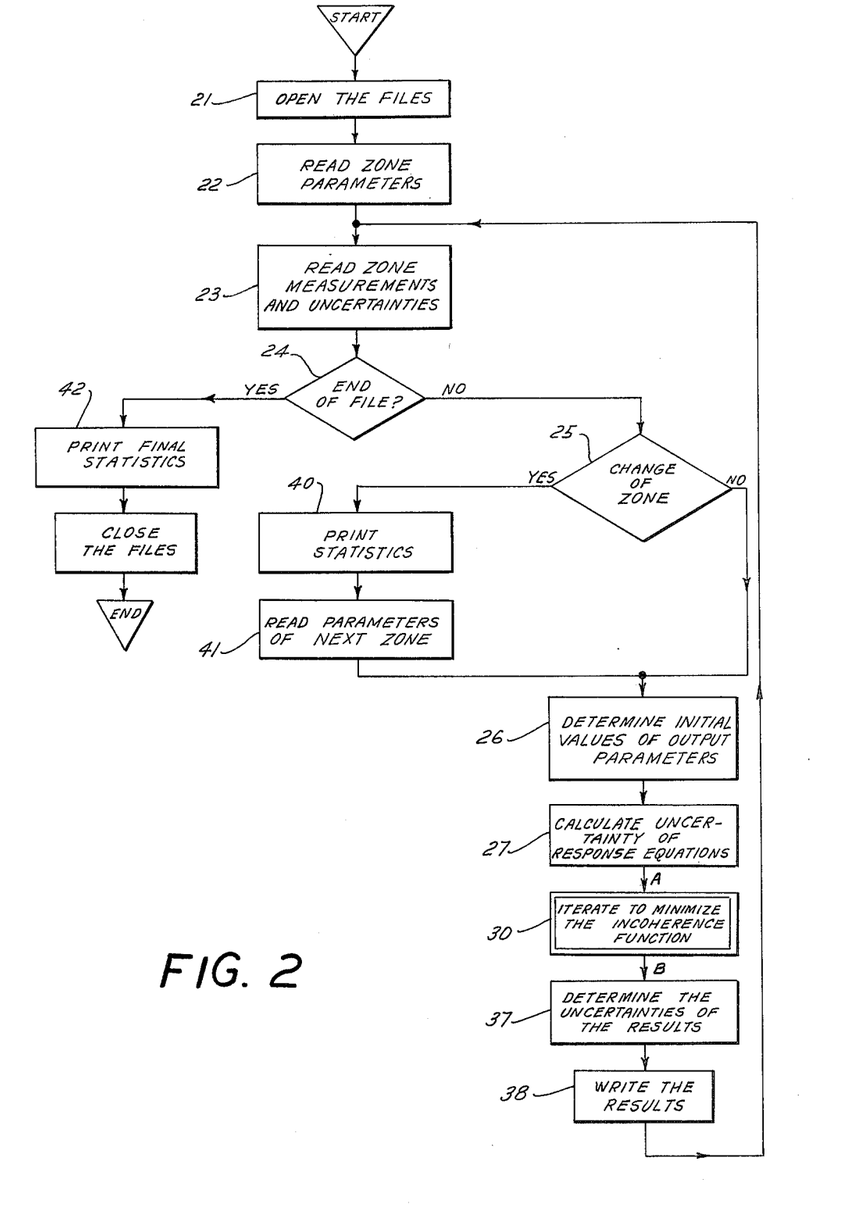
FIG. 2 is a flowchart of the major steps of the method for evaluating the formations according to the invention.

FIG. 2 represents the third part (at 15 in FIG. 1) of the processing in which are generated at each level the most probable values of the output parameters $\rho_{ma}$, $\phi$, $V_{cl}$, $S_w$ and $S_{xo}$ corresponding to the actual measurements. We shall first of all review the meaning of these symbols. A formation containing hydrocarbons includes, in the most usual case, a matrix proportion $V_{ma}$, a clay proportion or clay content $V_{cl}$, and a proportion occupied by porosity $\phi$. The total is of course equal to 100%, i.e.:

$$V_{ma} + V_{cl} + \phi = 1 \qquad (7)$$

In the pores of the formation is found a proportion of formation water having a resistivity $R_w$ called water saturation $S_w$ and a proportion of hydrocarbons $S_h$. As previously, we have:

$$S_w + S_h = 1 \qquad (8)$$

In the vicinity of the borehole within the invaded zone, all the formation water and part of the hydrocarbons are replaced by mud filtrate with a resistivity $R_{mf}$. The pores of the formation are thus filled by a proportion $S_{xo}$ of mud filtrate and a proportion $S_{hr}$ of residual hydrocarbons. As previously, we have:

$$S_{xo} + S_{hr} = 1 \qquad (9)$$

moreover
$$S_{hr} \leq S_h \qquad (10)$$

We see that, having determined the parameters $\phi$, $V_{cl}$, $S_w$ and $S_{xo}$, we immediately deduce $V_{ma}$, $S_h$ and $S_{hr}$. Furthermore, equations are known which make it possible to express $\phi_{Nma}$, the neutron porosity of the matrix, as a function of $\rho_{ma}$, of $\phi$, and of $V_{cl}$. It is thus possible to find $\Delta t_{ma}$, the transit time, in the matrix according to the value of $\rho_{ma}$ by interpolation. The problem is thus to find, at each level, the five output parameters ($\phi$, $V_{cl}$, $S_w$, $S_{xo}$ and $\rho_{ma}$).

Referring to FIG. 2, after having opened the files (block 21), one reads (block 22) for the zone under investigation the zone parameters such as the clay parameters and fluid parameters described above. One then reads (block 23), for that level, the actual measurements and their uncertainties. If one is neither at the end of the file (negative reply to block 24) nor at the end of the zone (negative reply to block 25) one goes on to block 26 where the calculation of the output parameters begins.

DETERMINATION OF INITIAL VALUES

As the calculation of the output parameters is an iterative calculation, it is necessary to determine an initial estimate of each of the output parameters. The initial estimate should not be too removed from the final result in order to reduce the length of the calculations. Initial values can be obtained from the results obtained at the preceding level.

As an example, the initial values of $\rho_{ma}$ may be taken as equal to the corresponding values at the preceding level. When the gamma radioactivity measurement is available, the initial value of $V_{cl}$ is determined as follows:

$$V_{cl(ini)} = \frac{GR - GR_{(pre)} - V_{cl(pre)}[GR_{(pre)} - GR]}{GR_{cl} - GR_{(pre)}} \qquad (11)$$

The initial value of porosity $\phi$ is determined from the equation:

$$\phi_{(ini)} = \frac{\rho_b - \rho_{ma(ini)} - V_{cl(ini)}[\rho_{cl} - \rho_{ma(ini)}]}{\rho_{mf} \cdot S_{xo(pre)} + \rho_h[1 - S_{xo(pre)}] - \rho_{ma(ini)}} \qquad (12)$$

And the initial value of the water saturation $S_w$ is determined from a relationship which depends on the type of formation encountered. If, for example, the formation is of the Simandoux type, we use:

$$S_{w(ini)} = \left( \sqrt{\frac{V_{cl(ini)}^{\alpha 2}}{R_{cl}} + \frac{4\phi^{exphi}}{aR_w[1 - V_{cl(ini)}^\alpha]R_t}} - \frac{V_{cl(ini)}^\alpha}{R_{cl}} \right) \bigg/ \frac{2\phi^{exphi}}{aR_w[1 - V_{cl(ini)}^\alpha]} \qquad (13)$$

exphi being a predetermined exponent.

For the value $S_{xo}$ of the mud filtrate saturation we take:

$$S_{xo(ini)} = S_{x(ini)} \text{ in the case of oil-base muds} \qquad (14)$$

or $$S_{xo(ini)} = S_{w(ini)} \text{ in the case of water-base muds} \qquad (15)$$

with a limit toward the upper values, expwxo being a predetermined exponent.

RESPONSE EQUATIONS AND THEIR UNCERTAINTIES

At this point the concept of a tool response equation is introduced. A tool response equation relates a single measured parameter to a plurality of output parameters and zone parameters. For each response equation, a measure of uncertainty may be determined. The uncertainties of the response equations are calculated (block 27) from the estimated values of the output parameters. In fact, the uncertainty of a response equation of a logging apparatus may change for different values of a given variable. For example, it has been observed that the response equation of GR is more accurate (less uncertainty) when the clay content $V_{cl}$ is small. The uncertainty associated with each response equation may be broken down into several independent specific uncertainties as was the case for the uncertainties associated with the measured parameters. When this is done, the response equation uncertainties may be expressed in the general form $$\tau = \sqrt{\Sigma \tau_i^2} \tag{16}$$

where the $\tau_i$ are the specific uncertainties for the particular tool. It is evident that these specific uncertainties are tool and environment dependent and must be determined for each tool design and environmental condition.

The known response equation for density is:

$$\rho_b = \phi(\rho_{mf} - AS_{hr}) + V_{cl}\rho_{cl} + V_{ma}\rho_{ma} \tag{17}$$

In this equation A is a coefficient related to salinity P and to density $\rho_{mf}$ of the mud filtrate as well as to the density of the hydrocarbons $\rho_h$, as explained in the article by A. Poupon, W. R. Hoyle and A. W. Schmidt "Log Analysis in Formations with Complex Lithologies" (45th Annual Fall Meeting-SPE of AIME, 1970).

As concerns the measurement of neutron porosity, it has been found that the response equation may be expressed in the form:

$$\phi_N = \phi - \phi S_{hr}(BE + C) + V_{cl}\phi_{Ncl} = V_{ma}\phi_{Nma} \tag{18}$$

in which:

$$C = \frac{S_{xo} - S_w}{1 - S_{xo}} \times 10^{-15\phi}$$

where B and E are coefficients which are constant for the studied zone, B being related to the density of the hydrocarbons $\rho_h$, and E being a coefficient known under the name of "excavation effect" by specialists (see in particular the previously cited article by A. Poupon, et al).

For the measurement in sand of the acoustical transit time, the response equation is the following:

$$\Delta t = \phi \Delta t_{fl} CP + V_{cl} \Delta t_{cl} - V_{ma} \Delta t_{ma} \tag{19}$$

where $\Delta t_{fl}$ is the transit time in the formation fluid and CP is the compaction factor. $\Delta t_{ma}$ is the transit time in the pure matrix.

For the natural radioactivity, the response equation is:

$$GR \cong V_{cl} GR_{cl} + (1 - V_{cl}) GR_{sand} \tag{20}$$

where $GR_{cl}$ and $GR_{sand}$ are the readings of radioactivity for the studied zone in clay and in sand.

For the spontaneous potential, the response equation is:

$$SP = SSP \frac{\phi S_{xo}}{\phi S_{xo} + V_{cl}\phi_{Ncl}} \tag{21}$$

where SSP is the reading of the base line of the sands for the zone.

For the resistivities, it may be preferable to choose slightly different response equations depending on geographical regions. We shall cite here the so-called Simandoux equations given by the conductivities $C_{xo} = 1/R_{xo}$ and $C_t = 1/R_t$ (22) where:

$$C_{xo} = \frac{1}{R_{xo}} = \frac{V_{cl}^2}{R_{cl}} S_{xo}^{\frac{expsat}{2}} + \frac{\phi^{exphi}}{aRmf(1 - V_{cl})} S_{xo}^{expsat} \tag{23}$$

and $$C_t = \frac{1}{R_t} = \frac{V_{cl}^2}{R_{cl}} S_w^{\frac{expsat}{2}} + \frac{\phi^{exphi}}{aR_w(1 - V_{cl})} S_w^{expsat} \tag{24}$$

MINIMIZATION OF THE INCOHERENCE FUNCTION

Having determined the uncertainties of the response equations, we go on to the iterative calculation (block 30) whose purpose is to determine the most probable values of the output parameters which correspond to the actual measurements. This series of operations is shown in detail in the flow chart of FIG. 3.

Figure 3:
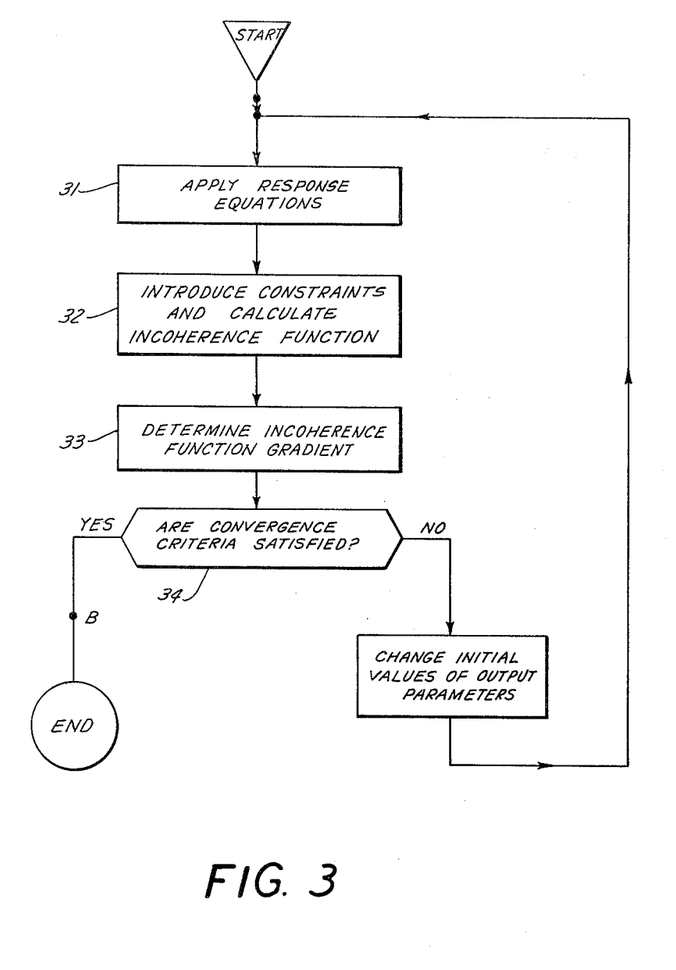
FIG. 3 is a more detailed part of the flowchart of FIG. 2.

The response equations of the logging apparatus are first solved with the initial values of the output parameters to obtain calculated values of the measurements (block 31). In this way the values of $\rho_b$, $\phi$, $\Delta t$, GR, SP, $R_t$ and $R_{xo}$ are calculated using, for example, the equations (17) through (24). In general, these calculated values will be called $f_i(x)$. Having determined calculated values for the $f_i(x)$, the differences or deviations $[f_i(x) - a_i]$ between the calculated values $f_i(x)$ and the actually measured values $a_i$ of the produced measurements are then calculated (block 32). Next, a weighting factor $P_i$ for each deviation is calculated from the uncertainties associated with the measurements and the response equations:

$$P_i = \frac{1}{\sigma_i^{*2} + \tau_i^2} \tag{25}$$

In this equation, the uncertainty $\sigma_i^{*2}$ is calculated from $\sigma_i$. It has been found that it is often preferable to use a first value of $\sigma$ in the case of a positive difference and a second value of $\sigma$ in the case of a negative difference. We shall call these values:

$\sigma^+$ when $a_i \leq f_i(x)$ and $\sigma^-$ when $a_i > f_i(x)$.

Moreover, a multiplication factor, "sigmul" or confidence factor, makes it possible to correct, if necessary, the calculated uncertainty values $\sigma_i$. This factor, generally taken equal to unity, allows the user to vary the confidence with the different measurements. Preferably, for the measurements of $\phi_N$ or $\Delta t$, the chosen uncertainty values are symmetrical and equal to $\sigma_i \times$ sigmul. On the other hand, for the density $\rho_b$ and for the measurements of $R_t$ and $R_{xo}$, different asymmetrical values $\sigma^+$ and $\sigma^-$ are taken.

An incoherence function is then calculated (block 32) by taking the sum of the differences squared, weighted by the factors $P_i$ of the equation (25) and introducing constraints, according to the equation:

$$F = \sum_i \frac{[f_i(x) - a_j]^2}{\sigma_i^{*2} + \tau_i^2} + \sum_j \frac{[g_j(x)]^2}{\tau_j^2} \tag{26}$$

The second term of the equation represents the introduction into the formula of "a-priori" constraints; i.e., conditions imposed from the start on the output parameters.

In fact, the output parameters are subject to several kinds of conditions. They are first of all subject to general conditions valid for all formations and all boreholes. For example, by definition, each of the parameters $\phi$, $V_{cl}$, $S_w$, $S_{xo}$ and $V_{ma}$ must be positive or zero. Similarly, each of them must be lower than or equal to one. In a zone of a given lithology having only two different matrices of density $\rho_{ma1}$ and $\rho_{ma2}$ the formations will have matrices of density $\rho_{ma}$ between $\rho_{ma1}$ and $\rho_{ma2}$. Other constraints relate the water saturation to the mud filtrate saturation, i.e., the residual hydrocarbon saturation in relation to the hydrocarbon saturation. All these constraints are expressed in the second term of equation (26).

Each constraint is associated with a standard deviation $\tau_j$ which is in general a constant. For the definition constraints of the type $\phi \geq 0$ or $\phi \leq 1$, the standard deviation $\tau_j$ can be taken equal to 0.001, for example. If a constraint is written $g_j(x) \geq 0$, the value $\bar{g}_j(x)$ is taken equal to $g_j(x)$ if $g_j(x)$ is negative, i.e., if the constraint is not complied with, or equal to zero in the opposite case. In other words, if an output parameter does not satisfy a predetermined condition, one calculates the deviation between this parameter and the limit it should not exceed and one calculates the corresponding term of the incoherence function by squaring this deviation and multiplying it by a weighting factor which is the inverse of the square of the associated standard deviation $\tau_j$.

The incoherence function F (47) is the sum, at the examined level, of all the terms for the various measurements and of all the terms due to the "a-priori" constraints.

The gradient of the incoherence function F is then calculated (block 33) in order to minimize this function. This minimization is carried out in accordance with the Fletcher-Powell method which calls for complex calculations and in particular an intermediate calculation of the partial derivatives of the response equations. One then checks whether the convergence criteria are satisfactory (block 34). If the value of the incoherence function is too high and can be substantially reduced, at least some of the values of the output parameters $\phi$, $V_{cl}$, $\rho_{ma}$ $S_w$, $S_{xo}$ (block 35) are modified to minimize this incoherence function and we return to block 31 where the response equations are applied again.

The minimization of the incoherence function F, assuming that the optimum is actually reached, makes it possible to find the most probable output parameters corresponding to all of the input measurements. In fact, calling a all the measurements and x the output parameters, we shall call P(x/a) the probability of obtaining x given all the measurements a. The problem is to find the maximum of P(x/a).

Bayes' theorem gives:

$$P(x/a) = K(a) P(a/x) \cdot P(x) \quad (27)$$

in which K(a) is a positive constant, P(a/x) is the probability of obtaining all the measurements a knowing all the output parameters x and P(x) is the probability of having the result x by ignoring the measurements ("a-priori" probabilities). The most probable solution is thus the solution for which the product [P(a/x)·P(x)] has the maximum value.

In the case of a measurement $a_i$ given by a response formula $f_i(x)$ with an error distributed according to the normal law, the probability $P(a_i/x)$ is given by:

$$P(a_i/x) = K_1 \frac{1}{\sqrt{\sigma_i^2 + \tau_i^2}} e^{-\frac{1}{2}\left(\frac{a_i - f_i(x)^2}{\sigma_i^2 + \tau_i^2}\right)} \quad (28)$$

$\sigma_i$ and $\tau_i$ being, as indicated earlier, the uncertainties due respectively to the measurement and to the equation $f_i(x)$. For all the measurements, P(a/x) is the product of the probabilities $P(a_i/x)$ which can be written in the form of an exponential function whose exponent $F_1$ is given by:

$$F_i = -\frac{1}{2} \Sigma \frac{[a_i - f_i(x)]^2}{\sigma_i^2 + \tau_i^2} + \frac{1}{2} \Sigma \text{Log}\left(\frac{1}{\sigma_i^2 + \tau_i^2}\right) \quad (29)$$

In the case of prior knowledge of an output parameter $(x_j)$, i.e., of a constraint which must be satisfied by this parameter, for example $g_j(x) \geq 0$, the "a-priori" probability $P(x_j)$ can be given by the expression:

$$P(x_j) = K_j \frac{1}{\tau_j} e^{-\frac{1}{2}\frac{[\bar{g_j}(x)]^2}{\tau_j^2}} \quad (30)$$

in which $\bar{g_j}(x)$ is the function defined previously, namely: $\bar{g_j}(x)$ is either equal to $g_j(x)$ if $g_j(x)$ is negative or equal to zero in the opposite case. For all the constraints, P(x) is the product of the $P(x_j)$ values which is written in the form of an exponential whose exponent is given by the expression:

$$F_2 = -\frac{1}{2} \Sigma \frac{[\bar{g_j}(x)]^2}{\tau_j^2} + \frac{1}{2} \Sigma \text{Log} \frac{1}{\tau_j^2} \quad (31)$$

The product [P(a/x)·P(x)] is an exponential having the exponent $(F_1 + F_2)$. The maximum of P(x/a) is thus obtained for the minimum of the incoherence function:

$$F' = -(F + F_2)$$

If a good approximation of x is known at the beginning of the calculations, the logarithmic terms of the expressions vary little and can be neglected. The function F' then takes the simplified form indicated on (26).

CALCULATION OF THE UNCERTAINTIES OF THE OUTPUT PARAMETERS

When the minimization is completed for this level, we go on to block 37 of FIG. 2 where we calculate the uncertainty of the output parameters at the examined level. The uncertainties of the measurements have been previously determined. The minimization of the incoherence function makes it possible to define an implicit function giving the most probable output parameters from the measurements. This implicit function in turn allows the definition of the uncertainty of the output parameters from the uncertainty of the measurements. Assuming that the result is effectively optimal; i.e., that the gradient of the incoherence function F is zero at this point, it can be demonstrated that the uncertainties of the output parameters are the square roots of the diagonal elements of the squared matrix given by the formula:

$$(A^t \Sigma t - 1A) - 1 \quad (32)$$

in which A designates the rectangular matrix of the first partial derivatives of the response equations in relation to the output parameters, $A^t$ the transpose of the matrix A, and in which $\Sigma$ is the diagonal matrix of the squares of the uncertainties $\sigma_i$ of the measurements, these being assumed to be mutually independent. The matrix ($A^t\sigma t - 1A$) being defined as positive and symmetrical, it can be inverted by standard methods.

Having obtained the output parameters and their uncertainties at the examined level, the results are entered in block 38 along with the theoretical measurements calculated from these most probable results and the procedure is repeated for the next level of the zone. After the last level of the zone has been processed (affirmative answer to block 25) the statistics concerning the zone are printed out (block 4θ) and the parameters of the following zone are read (block 41). This procedure is continued up to the end of the files (affirmative reply to block 24) and the final statistics are then printed out (block 42).

It is easy to add new measurements to the method just described. For each additional measurement, it is necessary to determine the uncertainty $\sigma_i$ at each level. Then, knowing the response equation of this new measurement, it is necessary in block (27) of FIG. 2 to determine the response equation uncertainty $\tau_i$. The additional measurement will then be introduced on the same basis as the others in the calculation of the incoherence function F (block 3θ). The method is thus well suited to the introduction of new measurements.

Previously it was stated that the parameters $R_t$ and $R_{xo}$ are considered on the same basis as the measurements $\rho_b$ and $\phi_N$, etc. $R_t$ and $R_{xo}$, however, are obtained by an initial application of the invention before being red in block 23. Upon completion of this initial processing, the intermediate output parameters $R_t$ and $R_{xo}$ have been obtained and are subsequently regarded as merely additional initial measurements.

DISPLAYS

Figure 4:
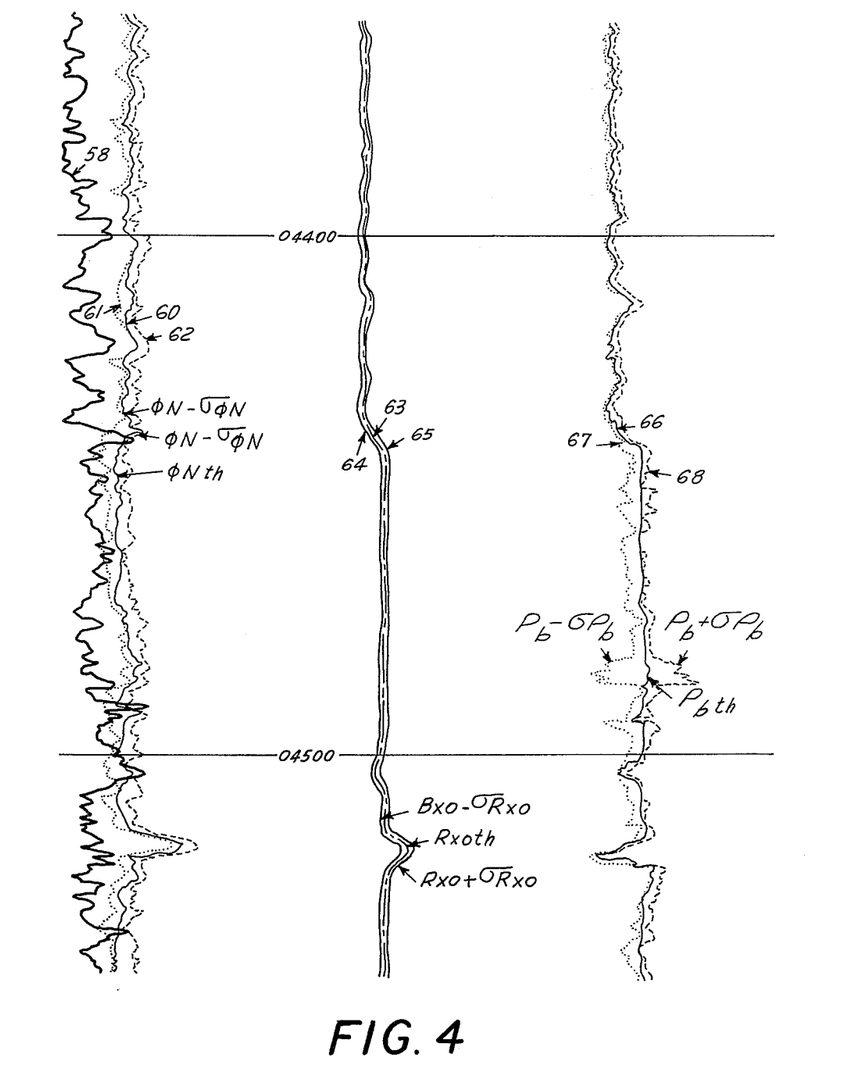
FIG. 4 is a graphic representation of the uncertainty ranges of the actual measurements compared with the theoretical measurements calculated according to the method of the invention.

FIG. 4 is a display which permits the visual comparison of the theoretical measurements with the actual borehole measurements. In this figure are represented log-like displays of the measurements $\phi_N$, $R_{xo}$ and $\rho_b$. The numbers between the two graphs represent depth in the borehole. In the left-hand part, three curves are plotted. The solid line 60 is a trace of the theoretically computed value of the measured parameter ($\phi_{Nth}$ obtained by applying the most probable output parameters furnished by the interpretation to the response equation of the logging apparatus). The other two curves in dotted lines, 61 and 62, define the range of uncertainty of the actually measured values of the parameter $\phi_N$; i.e., ($\phi_N - \sigma_{100 N}$) and ($\phi_N + \sigma_{\phi N}$).

In the middle part of the display, a bold-line curve 63 represents the theoretical measurement $R_{xoth}$ and the two thin-line curves 64 and 65 represent the produced measurements with their uncertainties ($R_{xo} - \sigma_{Rxo}$) and ($R_{xo} + \sigma_{Rxo}$). In the linearly scaled right-hand part of the display are also plotted three curves 66, 67 and 68 which represent respectively the theoretical measurement $\rho_{bth}$ and the produced measurement with its uncertainty ($\rho_b - \sigma_{\rho b}$) and ($\rho_b + \sigma_{\rho b}$)

Such a display provides at a glance an indication of the quality of the measurements and of the quality of the interpretation. If the uncertainty range of a measurement is very narrow and the theoretically calculated value falls within the range of uncertainty of the measured value, it may be concluded that the overall quality of the resultant output parameters is very good. A wide range of uncertainty on one of the measurements could give resultant values of the output parameters with a very good precision if the ranges of uncertainty of the other measurements are narrow. If, however, a theoretical measurement leaves the uncertainty range of one of the measurements over a certain formation interval, the corresponding values of the output parameters are immediately suspect. Such irregular behavior should make it possible to reveal abnormal characteristics of the formations, improper operation of a logging apparatus or errors with regard to interpretation. In this way the unique display of the measured parameters permits a judgment of the quality of the computed output parameters.

PRESENTATION OF RESULTS WITH THEIR UNCERTAINTIES

Figure 5:
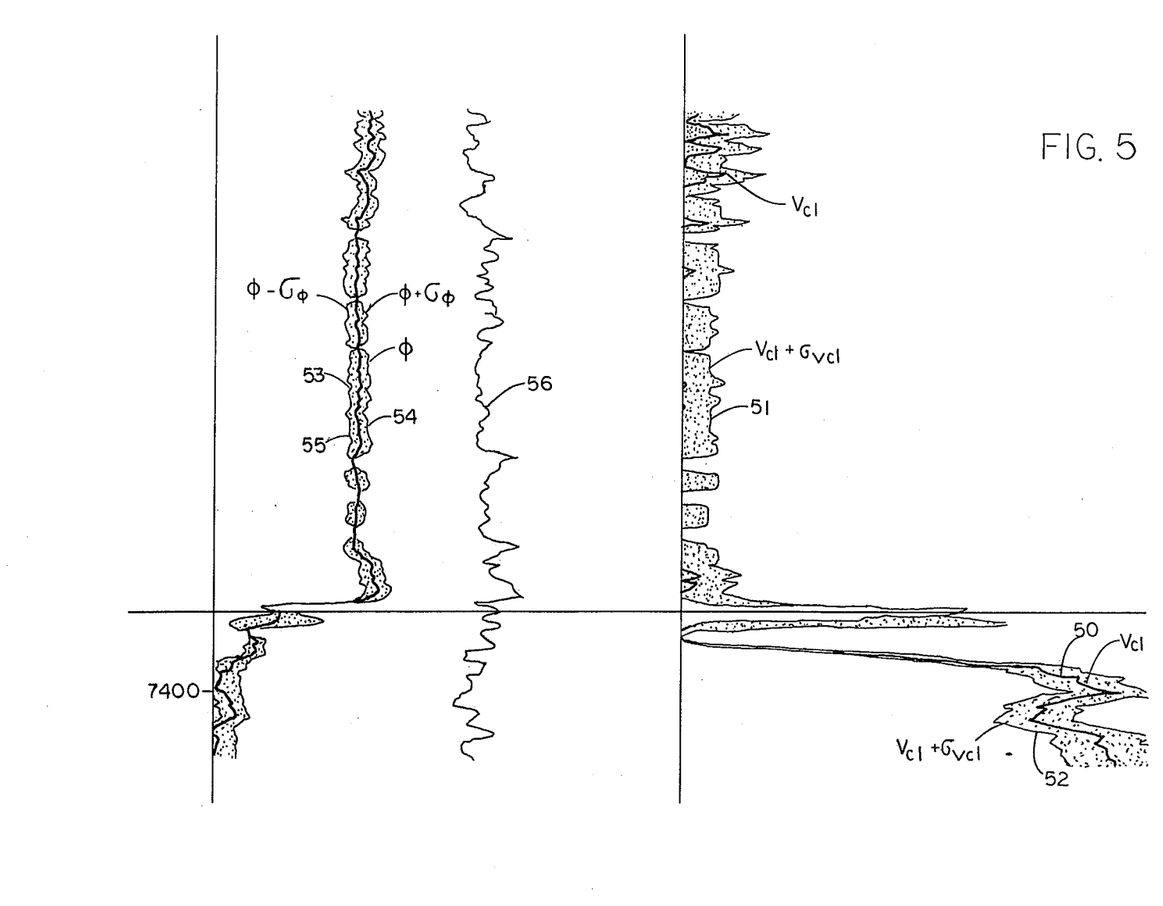
FIG. 5 is another graphic representation of output parameters with their uncertainty as a function of depth.

FIG. 5 is a representation of the final results obtained by the invention. The parameters represented here are the parameters $\phi$ and $S_w$. Similar to FIG. 4, the vertically-spaced numbers are indicative of depth. The borehole levels of increasing depth are thus plotted from top to bottom in the graph. On the right-hand part, three curves are plotted to represent porosity $\phi$ (53) with its range of uncertainty $\phi + \sigma_\phi$ (54), and ($\phi - \sigma_\phi$) (53). Three other curves are also plotted to represent the clay content $V_{cl}$ (5θ) and its range of uncertainty ($V_{cl} + \sigma_{Vcl}$) (51) and ($V_{cl} - \sigma_{Vcl}$) (52). Each curve is limited to values greater than or equal to zero. In the part of the graph located to the left of the depth column, a single curve 56 is plotted on a linear scale.

Curve 56 represents the value of the minimum of the incoherence function F. This parameter gives an estimate of the quality achieved by all the results in general.

The method just described is normally implemented in the form of a program capable of being applied to a standard commercial computer. The output results can be provided in the form of a list of figures or, as shown in FIGS. 4 and 5, in the form of graphs as a function of depth. One thus obtains, level by level, new parameters-uncertainties of measurements, uncertainties of results and theoretical measurements-which were hitherto not obtainable.

I claim:

1. A method for obtaining an improved display of an output parameter trace over a depth interval indicative of geologic formation characteristics from borehole derived raw data, including the steps of:
   (1) deriving actual values of measurement parameters over said depth interval;
   (2) assuming values for said output parameters over said depth interval;
   (3) calculating theoretical values of said measurement parameters over said depth interval;
   (4) displaying, over said depth interval, a trace of said assumed output parameters,
   (5) displaying, for said depth interval, in juxtaposition, representations indicative of a trace of said actual values, and a trace of said calculated theoretical values, whereby the degree of agreement between said trace of actual values and said trace of theoretical values is indicative of the reliability of said trace of output parameters.

2. The method as recited in claim 1 further including the steps of:
   (1) repetitively using different assumed values for said output parameters until the differences between the actual values and the calculated theoretical values for corresponding measurement parameters, as determined by an incoherence function, have been minimized;
   (2) displaying, in juxtaposition with said trace of output parameters a trace of the minimum values of said incoherence function as an indication of reliability of said said trace of output parameters.

3. A method for obtaining an improved display of an output parameter trace over a depth interval indicative of geologic formation characteristics from borehole derived raw data, including the steps of:
   (1) deriving actual values of measurement parameters over said depth interval from said raw data;
   (2) assuming values for said output parameters over said depth interval from which are calculated theoretical values of said measurement parameters;
   (3) repetitively calculating different theoretical values of said measurement parameters from different assumed values for said output parameters until the value of an incoherence function has reached a minimum, said incoherence function being dependent on the differences between said actual values and said calculated theoretical values;
   (4) displaying, in the form of traces over said depth interval, in juxtaposition, the minimum values of said incoherence function and the corresponding assumed values of said output parameters.

4. A method for obtaining an improved display of a trace representing the behavior of output parameters characteristic of the geologic formations over a depth interval traversed by a borehole, said method including the steps of:
   (a) physically logging said borehole depth interval by passing investigative logging tools through said borehole and recording the resultant raw data on formation characteristics and environmental conditions;
   (b) from said raw data, obtaining actual values over said depth interval for a plurality of measurement parameters;
   (c) deriving at least an equal plurality of response equations, each of which expresses a single measurement parameter as a function of one or more of said output parameters;
   (d) assuming values for each of said output parameters at a particular depth in said depth interval;
   (e) from said assumed values and said response equations, determining theoretical values for each of said measurement parameters;
   (f) repeating steps d and e to obtain optimum theoretical values for which the difference between the actual values and their respective theoretical values have been made optimally small;
   (g) repeating steps d, e and f for a plurality of different depths in said depth interval;
   (h) recording, for comparison, on a visually readable medium, a trace indicative of said actual values over said depth interval along with a trace over said depth interval of respective optimum theoretical values and also recording at least one trace over said depth interval comprising those assumed values of said output parameters which correspond to the recorded trace of optimal theoretical values, whereby the visually ascertainable degree of agreement between said trace of actual values and said trace of optimal theoretical values is indicated of the reliability of said at least one trace of assumed values.

5. The method as recited in claim 4, further including the step of determining, from said data on environmental conditions and from the logging tools themselves, measurement parameter uncertainties of said actual values, and wherein said step of recording a trace indicative of said actual values includes the steps of separately modifying said trace indicative of said actual values by each of the positive and negative values of said corresponding measurement parameter uncertainties and recording each of the modified traces.

6. The method as recited in claim 5 wherein said method is practiced over a multiplicity of different levels in the borehole and in that the step of recording produces a number of continuous traces which not only contain information relative to each level but which also contain information relative to the degree and type of change of formation characteristics from level to level.

7. The method as recited in claim 5 wherein said step of determining measurement parameter uncertainties includes the determination of a positive uncertainty of a first magnitude and a negative uncertainty of a second, different magnitude.

8. The method as recited in claim 5 wherein said step of deriving an equal plurality of response equations includes the step of determining an uncertainty for each response equation.

9. The method as recited in claim 8, wherein said step of repeating steps d and e until the differences between the actual values and their respective theoretical values have been made optimally small, includes the further steps of:
   (1) comparing the actual and the theoretical values of each of said measurement parameters to obtain a plurality of differences;
   (2) constructing an incoherence function composed of each of said plurality of differences weighted by a factor dependent on both said measurement parameter and response equation uncertainties; and
   (3) repetitively selecting subsequent assumed values of said output parameters in order to minimize said incoherence function.

10. The method according to claim 6, wherein the step of determining measurement parameter uncertainties includes the step of determining independent specific uncertainties due to distinct error sources.

11. The method according to claim 10, wherein the step of determining specific uncertainties comprises determining at least one specific uncertainty as a function of an environmental condition.

12. The method according to claim 11, wherein the step of determining specific uncertainties comprises determining said specific uncertainties as a function of actual values taken from among the measurement parameter actual values obtained at the examined level and at nearby levels.

13. The method according to one of the claims 10 to 12, wherein the step for determining specific uncertainties includes determining, for at least one measurement parameter, an uncertainty due to statistical variations, said statistical uncertainty being determined as a function of the actual value of said at least one measurement parameter at the examined level.

14. The method according to one of the claims 10 to 12, wherein the step for determining specific uncertainties at the examined level comprises:

determining, for at least one measurement parameter, an uncertainty being determined as a function of variations in the borehole diameter at levels near the examined level.

15. The method according to one of the claims 10 to 12, wherein the step for determining specific uncertainties at the examined level comprises determining, for at least one measurement parameter, an uncertainty due to depth correltion errors, said depth uncertainty being determined as a function of the actual value of said at least one measurement parameter at levels near the examined level.

16. The method according to claim 10, wherein the step for determining measurement parameter uncertainties comprises calculating the square root of the sum of the squares of said specific uncertainties.

17. The method according to claim 8, wherein the step of determining an uncertainty associated with each of said response equations comprises the step of determining, for each response equation, specific uncertainties which are respectively functions of said assumed values of said output parameters.

18. The method according to claim 17, wherein the step of determining uncertainties associated with each of said response equations comprises calculating the square root of the sum of the squares of said specific uncertainties.

19. The method according to claim 9 further including the step of determining said weighting factors by calculating the inverse of the sum of the squares of the uncertainties associated with the measurement parameters and the squares of the uncertainties associated with the response equations.

20. The method according to one of the claims 9 or 19, wherein said step of constructing an incoherence function includes carrying out the sum of the squares of said differences multiplied by said weighting factors.

21. The method according to claim 20, wherein the step of constructing an incoherence function includes combining, with said weighted differences, terms coming from a-priori constraints.

22. The method according to claim 21, wherein said step of constructing said incoherence function comprises:

calculating deviations between output parameters and limits which they must not exceed; and multiplying the squares of these deviations by predetermined weighting factors to calculate the terms coming from a-priori constraints.

23. The method according to claim 4, further including the step consisting of determining at the examined level the uncertainties of said output parameters.

24. The method according to claim 23, further including the step of representing each of said output parameters by recording the limits of its uncertainty range at each level.

25. The method according to claim 9, further including the step of recording the minimum value of said incoherence function as an indication of reliability.

26. A method of obtaining an improved display of a trace over a depth interval of values of output parameters characteristic of the geologic formations traversed by a borehole, said method including the steps of:

(a) generating signals indicative of actual values for a plurality of borehole and/or formation parameters;

(b) deriving a plurality of response equations which functionally relate at least some of said formation parameters to said output parameters;

(c) utilizing said response equations and assumed values of said output parameters to obtain signals indicative of calculated or theoretical values for each of said at least some of said formation parameters;

(d) generating signals indicative of uncertainties for said responsive equations and for each of said at least some of said formation parameters;

(e) generating signals indicative of the differences between said calculated or theoretical value signals and said actual value signals;

(f) generating signals indicative of weighting factors dependent on said response equation uncertainty signals and said formation parameter uncertainty signals, said weighting factor signals being functionally related to the inverse of the sum of the squares of said uncertainty signals;

(g) combining said difference signals and said weighting factor signals to generate an incoherence function signal functionally related to the sum of the squares of said difference signals and directly related to said weighting factor signals;

(h) varying said assumed values of said output parameters until said incoherence signal has obtained a minimum value and generating output parameter signals indicative of the assumed values corresponding to said minimum incoherence signal;

(i) recording on a medium a trace representation over said depth interval of an output parameter signal and a trace representation over said depth interval of said minimum incoherence function signal.

* * * * *